Feb. 22, 1927.

E. C. LISK 1,618,839

TRAIL CHART

Filed March 7, 1925

*Inventor*
EARL C. LISK

ATTORNEYS

Patented Feb. 22, 1927.

1,618,839

UNITED STATES PATENT OFFICE.

EARL CLAUD LISK, OF MINNEAPOLIS, MINNESOTA.

TRAIL CHART.

Application filed March 7, 1925. Serial No. 13,840.

In automobile touring, it is customary to follow a State or Federal highway between large towns, and maps are provided having the different trails indicated thereon with the position of intermediate points and the distances apart and the distance from the initial or starting point to the objective or destination. These maps are more or less inconvenient to carry and open up for purposes of inspection along the road and soon become worn and defaced, particularly where the map is comparatively large and has a number of trails thereon radiating from different points, or if there is one map for a long trail extending through a territory requiring several days' touring to traverse.

The object, therefore, of my invention is to provide a trail chart adapted for a single route or trail and generally or preferably for one day's run, a new chart being provided for each succeeding day, said chart being adapted to be mounted in any convenient place on the windshield in front of the driver where it can be conveniently inspected en route.

A further object is to provide a chart having pictured thereon at intervals the points of interest of places along the line with descriptive matter of such places and blanks wherein the traveler may write memoranda or comments of the places or points of interest.

A further object is to indicate the trail on a comparatively long narrow band of flexible material that is adapted to be folded into convenient form for carrying in the pocket and is provided with a panel in which an address may be written and the folded chart deposited in the mail or filed away if preferred.

Other objects of the invention will appear from the following detailed description.

In the accompanying drawings forming part of this specification,

Figure 1:
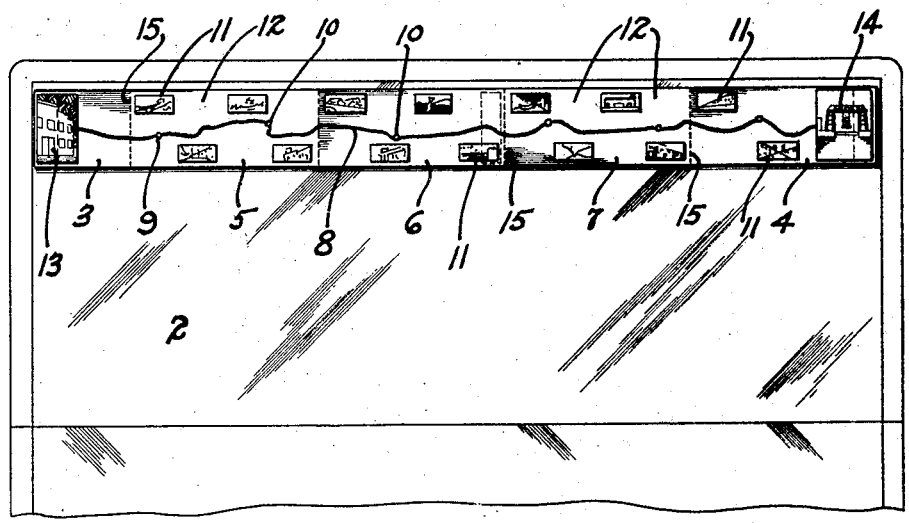
Figure 1 is a view of a portion of a windshield with my improved trail chart mounted thereon.
Figure 2:
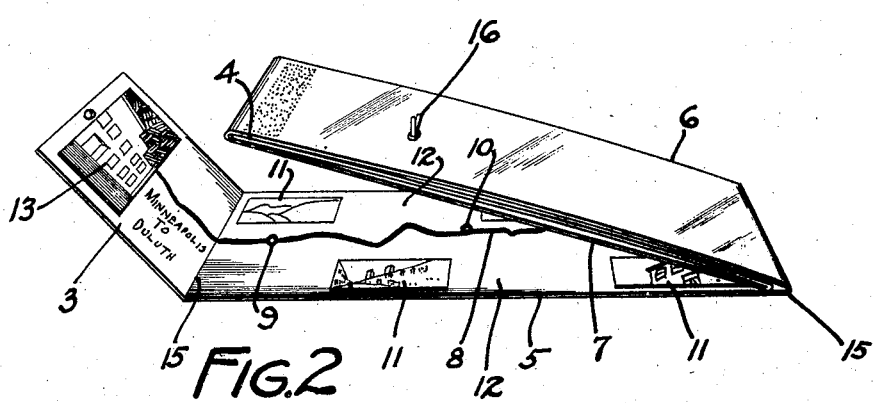
Figure 2 is a view showing the chart partially folded to adapt it for mailing purposes.
Figure 3:
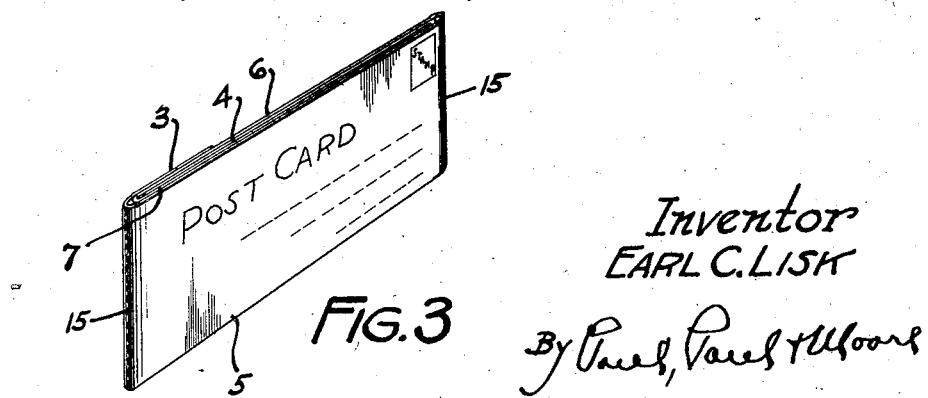
Figure 3 illustrates the chart fully folded ready to be addressed and mailed.

In the drawings, 2 represents a windshield of conventional form upon which the trail chart is mounted in any suitable manner for convenience of inspection by the driver of the car. This chart comprises end flaps or panels 3 and 4 and intermediate panels 5, 6 and 7, all of suitable length, the aggregate being preferably about the length of a windshield. These panels are composed of a band of comparatively narrow flexible material, preferably heavy paper although any other suitable material may be employed. Upon the band, along the center line thereof, a trail 8 is indicated representing preferably a State or Federal highway connecting two large towns and generally the distance between these towns will be equivalent to the ordinary day's run of a car. The points of interest or the towns through which the trail passes are indicated as at 9 and 10, and adjacent to the mark representing a town, I prefer to insert a picture as indicated at 11 representing some building of interest such as a library or art gallery or some building of particular architectural interest such as a State capitol. Adjacent to the pictures, I prefer to provide a blank space 12 in which the traveler may make memoranda or comments on the points of interest along the route, and upon reaching the destination these memoranda will constitute a diary or journal of the day's run. I may in the initial panel 3 insert the picture of some initial or starting point of interest such as an automobile club town house and the final panel may be some unique structure or point of interest at the destination. In this particular chart, I have indicated a conventional form of building 13 in the initial panel and an aerial bridge 14 as the objective at destination. Of course, it will be understood that any other building or structure or some natural point of interest as a park or lake may be indicated in these panels instead of the matter shown therein. The panels are separated by transverse score lines 15 and when the destination is reached and the chart is removed from the windshield, it may be folded transversely along these score lines and the initial panel will form a flap adapted to be secured by a fastening means such as 16 to prevent premature unfolding of the chart and the face of the panel on the other side will be printed and ruled to form an address blank so that the chart may be addressed and mailed when the user reaches his destination back to the starting point or to some friend at a distance who may be contemplating a similar tour and would be interested to read the comments of a person on the different points of interest while passing over the trail.

The chart in its folded form may be conveniently carried in the pocket, making a long narrow fold which may be placed in an envelope if desired and sold in that form to tourists. A selection or series of charts may be kept in one envelope comprising the road maps for a certain tour, similar to the manner of selling a dozen or more of picture post cards taken around a certain locality. The band on which the trail is indicated is comparatively narrow and when placed on the windshield in front of the driver will not in any way interfere with his vision and whenever desired can be inspected without the necessity of removing the hands from the steering wheel.

The reverse face of the band or the side adjacent the glass of the windshield is adapted for advertising matter printed thereon or suitably displayed and plainly visible through the glass of the windshield to a person looking at the front of the car. This advertising space may be sold to various users of an advertising medium and each chart of a certain day's run may bear the same advertising matter while the chart for the next day's run may have other advertising material thereon. This advertising may relate to the advantages of resorts along the route or to car accessories and where such may be purchased.

I have shown the chart mounted in the top of the windshield but it may be placed in the lower portion thereof if preferred.

The details of construction herein shown and described may be modified and still be within the scope of my invention.

I claim as my invention:

A trail chart comprising a long and narrow band of material scored at intervals of its length to facilitate folding thereof, the first fold having thereon the representation of the starting point of the trail, the second fold having on its back a blank space for a mailing address and on its front face a map showing the turns in the trail, the other folds or panels also showing the turns in the trail, and having marked thereon the points of interest in the trail with representations of houses or other places of interest at the first mentioned point of interest with blank spaces between the representations of the houses or points of interest for the insertion of notes by the user, the last fold having also at its end a representation of some point of interest to be visited, the chart being foldable on the scored lines, and its third fold having means for attaching the first fold thereto whereby the chart may be easily folded and converted into a postcard.

In witness whereof, I have hereunto set my hand this 3d day of March, 1925.

EARL CLAUD LISK.